United States Patent
Kloth et al.

(10) Patent No.: US 9,900,327 B2
(45) Date of Patent: Feb. 20, 2018

(54) METHOD FOR DETECTING AN ATTACK IN A COMPUTER NETWORK

(71) Applicant: Deutsche Telekom AG, Bonn (DE)

(72) Inventors: Mathias Kloth, Bergisch Gladbach (DE); Michael Westphalen, Cologne (DE)

(73) Assignee: DEUTSCHE TELEKOM AG, Bonn (DE)

(*) Notice: Subject to any disclaimer, the term of this patent is extended or adjusted under 35 U.S.C. 154(b) by 46 days.

(21) Appl. No.: 14/801,913

(22) Filed: Jul. 17, 2015

(65) Prior Publication Data
US 2016/0021128 A1 Jan. 21, 2016

(30) Foreign Application Priority Data
Jul. 18, 2014 (EP) .................... 14177647

(51) Int. Cl.
*G06F 21/00* (2013.01)
*H04L 29/06* (2006.01)
*H04L 12/24* (2006.01)

(52) U.S. Cl.
CPC ...... *H04L 63/1416* (2013.01); *H04L 63/1408* (2013.01); *H04L 41/0604* (2013.01); *H04L 41/069* (2013.01); *H04L 41/0681* (2013.01)

(58) Field of Classification Search
CPC ............. H04L 63/1416; H04L 63/1408; H04L 63/1425; H04L 41/0604; H04L 41/0681; H04L 41/069
See application file for complete search history.

(56) References Cited

U.S. PATENT DOCUMENTS

| | | |
|---|---|---|
| 2002/0082886 A1 | 6/2002 | Manganaris et al. |
| 2008/0209517 A1* | 8/2008 | Nightingale ........ H04L 63/1416 726/3 |

FOREIGN PATENT DOCUMENTS

| | | | |
|---|---|---|---|
| WO | WO2013016245 | * | 1/2013 |
| WO | WO 2013016245 A1 | | 1/2013 |

* cited by examiner

*Primary Examiner* — Kendall Dolly
(74) *Attorney, Agent, or Firm* — Leydig, Voit & Mayer, Ltd.

(57) ABSTRACT

A method for detecting an attack in a computer network having a plurality of computers includes: receiving a plurality of warning messages from the computers, the warning messages being based on different types of anomalies in the computer network; comparing a number of warning messages from the plurality of received warning messages with a predetermined event threshold, the number of warning messages being based on a single type of anomaly in the computer network; and outputting an alarm signal if the number of warning messages based on the same type of anomaly in the computer network falls below the event threshold.

15 Claims, 6 Drawing Sheets

METHOD FOR DETECTING AN ATTACK IN A COMPUTER NETWORK

CROSS-REFERENCE TO RELATED APPLICATIONS

Priority is claimed to European Patent Application No. EP 14 177 647.6, filed on Jul. 18, 2014, the entire disclosure of which is hereby incorporated by reference herein.

FIELD

The present invention relates to a method and to an analysis system for detecting an attack in a computer network.

BACKGROUND

The theft of business secrets is often carried out unnoticed by planting malware in a company's computer network. Attacks of this type sometimes make use of self-developed malware individually adjusted to the specific use, which is not detected by commercially available antivirus products or not until very late. As potential victims of a digital espionage attack, it is possible for companies to prepare themselves, but the exact circumstances such as place, time and configuration are generally unknown. To detect and repel attacks of this type, an attacked company may sometimes face the challenge of linking a large volume of heterogeneous protocol data from different security and operating systems to form a meaningful and informative picture.

SUMMARY

In an embodiment, the present invention provides a method for detecting an attack in a computer network comprising a plurality of computers. The method includes: receiving a plurality of warning messages from the computers, the warning messages being based on different types of anomalies in the computer network; comparing a number of warning messages from the plurality of received warning messages with a predetermined event threshold, the number of warning messages being based on a single type of anomaly in the computer network; and outputting an alarm signal if the number of warning messages based on the same type of anomaly in the computer network falls below the event threshold.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
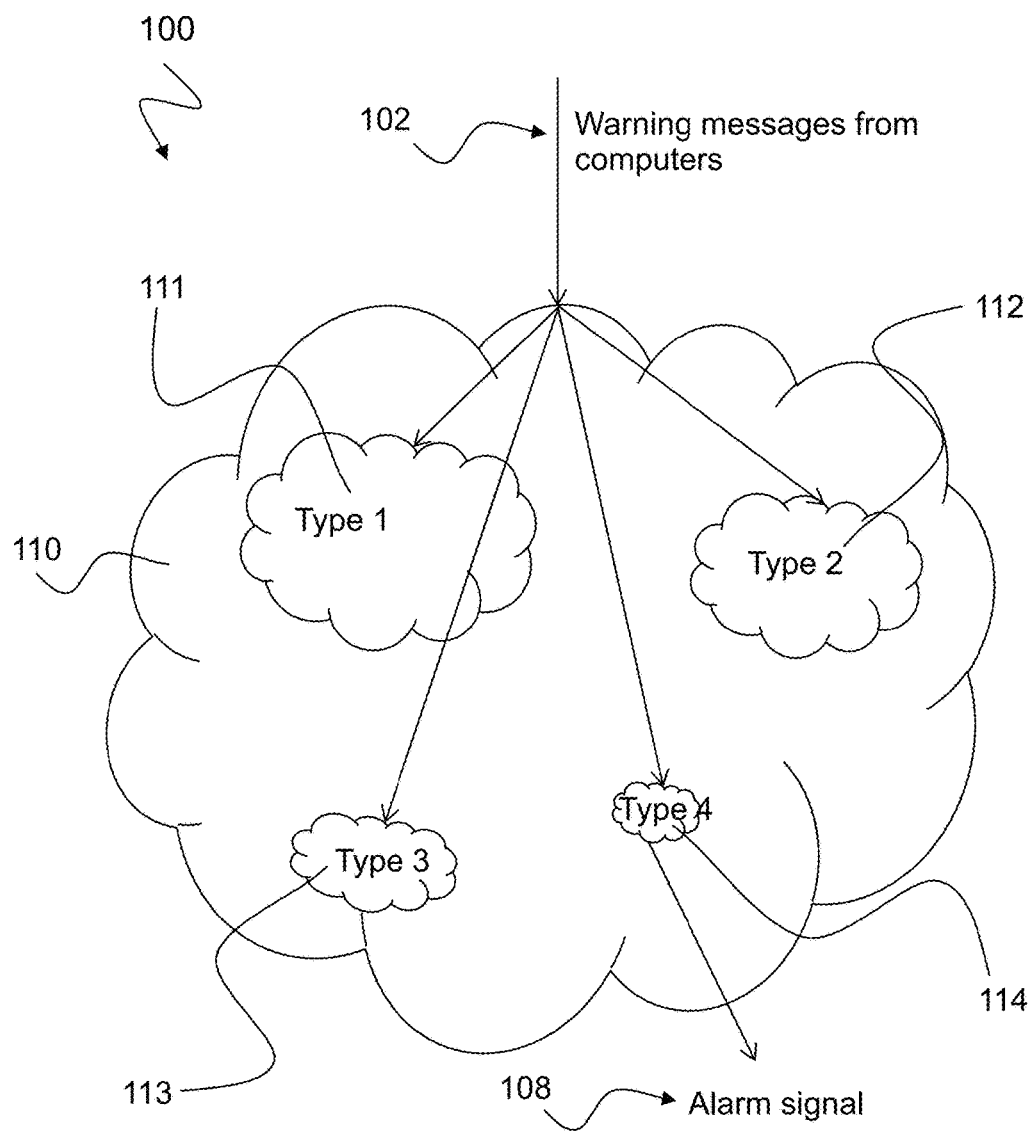
FIG. 1 is a schematic illustration of an embodiment of a classification 100 of warning messages into different types of anomalies.

In an embodiment, the present invention provides for detecting an attack in a computer network.

The methods and systems set out in the following may be based on recording data from an SIEM (security information and event management) system. "SIEM system" is a term for software and product services which combine security information management (SIM) with security event management (SEM). SIEM technology provides real-time analysis of security alarms, which may be generated by network hardware and network applications. SIEM may be sold in the form of software, applications or related services, and may also be used to record security-related data and generate reports for compliance applications.

The methods and systems set out in the following may provide an indicator or alarm signal for an attack on a computer system using a C2 (command and control) server. Command and control servers are centralised machines or computer servers capable of sending commands and obtaining responses from machines or computers which are part of a bot network. Attackers who want to initiate a DDoS (distributed denial of service) attack can, at any time, send special commands comprising instructions to attack a particular target computer to the C2 server of their bot network, and every infected machine which is communicating with the contacted C2 server will accordingly initiate a coordinated attack on the target computer.

The methods and systems set out in the following may be used to protect a computer network from attacks from bot networks, in particular from DDoS attacks, spamming attacks, sniffing attacks, phishing attacks, malware propagation, keylogging, installation of undesirable software, identity theft, manipulation of the computer network.

The methods and systems set out in the following may be used in the field of information technology (IT). Information technology is an umbrella term for information and data processing and the hardware and software required therefor. The information technology of a company comprises all technical devices for generating, processing and passing on information.

For describing the invention in detail, the following abbreviations and terms are used:
IT: information technology
SIEM security information and event management
SIM: security information management
SEM: security event management
C2 server: command and control server One aspect of the invention relates to a method for detecting an attack in a computer network comprising a plurality of computers, comprising the following steps:

receiving a plurality of warning messages from the computers, the warning messages being based on different types of anomalies in the computer network; comparing a number of warning messages from the plurality of received warning messages with a predetermined event threshold, the number of warning messages being based on a single type of anomaly in the computer network; and outputting an alarm signal if the number of warning messages based on the same type of anomaly in the computer network falls below the event threshold.

An advantage of a method of this type is that the method can rapidly and reliably trigger an alarm signal in the event of an imminent attack on the computer network. The computers in the computer network always generate a large number of warning messages, for example in the event of a non-functioning software update, when the processor is overloaded, when a software update has not yet been carried out, when a password is entered incorrectly, when Internet access is temporarily unavailable, when it is not possible to access particular data etc. These warning messages are due to particular anomalies in the computer network, which occur more or less frequently during operation and generally require interaction by the user to eliminate them. Non-critical or slight anomalies in the computer system, such as a software update which has not been carried out or overloading of the processor, occur very frequently and are easy to eliminate. By contrast, critical anomalies, such as unexpected failure of particular components of the system or inability to access rarely used system resources, only occur very rarely, and therefore so do the relevant warning messages.

The method detects a possible or imminent attack on the computer network or computer system on the basis of these critical anomalies in the network. For this purpose, it is possible to assign the number of occurring warning messages to the possible anomalies in the computer network and count them. If the number of warning messages based on the same type of anomaly in the computer network falls below an event threshold, the user of the computer network can be warned, by the triggering of an alarm, that a possible attack is imminent or has already taken place.

It is thus possible to output an alarm signal in a flexible, rapid and precise manner in the event of a possible attack on the computer network. As a result of the modular construction of the method, the individual method steps can be implemented flexibly on different software or hardware components, for example on components within the computer network or on external components outside the computer network.

In an embodiment, the method comprises receiving a plurality of warning messages in a predetermined time interval.

This has the advantage that warning messages based on different types of anomaly in the computer network can be measured over the same time period, in such a way that the event threshold always relates to the same time period for the different types of warning messages. In this way, it is reliably possible to identify rarely occurring anomalies which signal a possible attack or an attack which has already taken place on the computer network. The method thus operates very precisely and reliably.

In an embodiment, the method comprises classifying the plurality of warning messages by the type of anomaly indicated by a respective warning message.

This has the advantage that the relevant warning messages which signal a critical anomaly in the computer network can rapidly be filtered out from the large number of incoming warning messages.

In an embodiment, the method comprises determining the type of anomaly indicated by a warning message on the basis of the content of the warning message.

This has the advantage that the type of anomaly can easily be determined, for example by querying a particular data field or flag within the warning message, which may for example be in the form of a data packet comprising a header and a payload. If the anomaly can be determined on the basis of the content of the warning message, no further information is required to determine it, and this makes the method simple and reliable.

In an embodiment, the method comprises counting the received warning messages which are classified as the same type in the predetermined time interval, so as to determine the number, and outputting the alarm signal if the number of warning messages counted in the predetermined time interval which are classified as the same type falls below the event threshold.

This has the advantage that the method is very simple to carry out, for example using a switch, a plurality of counters and a timer or clock. On the basis of the type of anomaly signalled by the warning messages, the switch can supply them to a respective counter, which counts the number of warning messages supplied thereto. Once a particular time indicated by the timer has elapsed, the counter values can be read. Once one of the read counter values has fallen below the event threshold, an alarm can be triggered. The method can thus be implemented using simple logic circuits, for example on an IC or a chip.

In an embodiment, the method comprises determining the probability of the presence of an attack on the computer network on the basis of the number of warning messages which fall below the event threshold.

This has the advantage that the alarm can be graded using the probability value. The alarm may be triggered even at a low probability of an attack, the probability value signalling the severity of the attack. For example, a low probability value may be indicated as a green alarm light, a medium probability value by a yellow alarm light and a high probability value by a red alarm light. By way of the probability value, the user obtains more information about the nature or severity of the possible or imminent attack.

In an embodiment, the method comprises determining the probability value for the presence of an attack on the computer network, further on the basis of at least one of the following predetermined parameters: blacklists, whitelists, thresholds, event correlations, and definition of threat potentials of individual user groups of the computer network.

This has the advantage that rarely occurring events or anomalies in the computer network which can actually be associated with a normal state of the system can be better delimited from rarely occurring events which are associated with a threat to the computer network. By way of these parameters, the knowledge base of the user of the computer network can also be introduced into the detection. Thus, in particular, situations from the past (for example thresholds, event correlations) and currently existing threats (for example blacklists, whitelists, threat potentials of individual groups of people) can be taken into account.

In an embodiment, the method comprises determining the probability value for the presence of an attack on the computer network, further on the basis of a number of visitors to the computer network, in particular a number of visitors to a Web page of the computer network.

This has the advantage that an attack can reliably be detected by way of the number of users. If a Web page is being visited by many different users, this may represent the normal state. If the Web page is only being visited by a few users, there may be an attack on the Web page. Data from the users may also be included in the analysis, for example their IP addresses, domain name, server, time and duration of access or geographic location where they are based. For example, it may be conspicuous if many users from different geographical locations are accessing a Web page or if an increased occurrence of accesses can be observed during the night. If information of this type is used, the reliability of detecting an attack can be even further increased.

In an embodiment, the method comprises determining the probability value for the presence of an attack on the computer network, further on the basis of a frequency of rarely executed processes in the computer network.

A computer network which is in the normal state generally operates using the same processes. Rarely executed processes may thus, in a simple manner, provide an indication of an anomaly and therefore a possible threat.

In an embodiment, the method comprises determining the probability value for the presence of an attack on the computer network, further on the basis of a frequency of programs which are being executed on a predetermined group of the plurality of computers in the computer network, in particular on the basis of a frequency of programs which have only been executed on the predetermined group of computers since a predetermined time.

This has the advantage that by way of an evaluation of this type the method can simply and reliably detect possible virus programs or malware which are being executed on individual computers or small groups of computers.

In an embodiment, the method comprises using one or more of the following systems on at least one of the plurality of computers to generate the warning messages: virus scanner, proxy server, IDS (intrusion detection system), firewall, operating system, log management system, security information and event management system.

The advantage of a method of this type is that the stated systems can be used to determine various characteristics of the system and pass them on by way of the warning messages. By analysing a large volume of protocol data, it is possible for the method to detect a peculiarity or anomaly earlier than is possible by considering the current network indicators.

Thus, to generate the warning messages, it is possible to fall back upon pre-existing infrastructure, for example previously installed protocol data systems which record relevant data. The analysis can be carried out by various analysis methods, for example by artificial intelligence methods or using neural networks, and provides reliable analysis results, which can be prepared in the form of events. The analysis can delimit the large volume of data in the computer network to the relevant aspects or provide a number of relevant events which can subsequently be further restricted.

In an embodiment, the method comprises adjusting the event threshold on the basis of the number of warning messages which fall below the event threshold.

This has the advantage that findings about the computer network can influence the event threshold, for example by way of the structure and the individual components of the network. The indicator can thus be adjusted flexibly to varying environmental influences, for example additional software or hardware components in the computer network.

In an embodiment, the method comprises adaptive adjustment of the event threshold as a function of at least one of the following events: user feedback, changes in the network architecture of the computer network, changes in the number of computers in the computer network.

A method of this type has the advantage that it can be flexibly adjusted to a changed structure and that the knowledge of the user can also influence the decision-making.

An aspect of the invention relates to an analysis system for detecting an attack in a computer network comprising a plurality of computers, comprising: a receiving module configured to receive a plurality of warning messages from the computers, the warning messages being based on different types of anomalies in the computer network; a comparison module configured to compare a number of warning messages from the plurality of received warning messages with a predetermined event threshold, the number of warning messages being based on a single type of anomaly in the computer network; and an output module configured to output an alarm signal if the number of warning messages based on the same type of anomaly in the computer network falls below the event threshold.

An advantage of an analysis system of this type is that the system can rapidly and reliably trigger an alarm signal in the event of an imminent attack on the computer network. The analysis system can reliably detect a possible or imminent attack on the computer network or computer system on the basis of critical anomalies in the network which are indicated by the warning messages. The system may assign the number of occurring warning messages to the possible anomalies in the computer network and count them. If the number of a particular anomaly is large, in other words exceeds a particular threshold, a frequently occurring anomaly in the computer network, which is therefore to be classified as non-critical, is to be assumed. By contrast, if the number of a particular anomaly is low, in other words falls below the event threshold, a rarely occurring anomaly in the computer network, which is therefore to be classified as critical, is to be assumed. In the event of falling below the event threshold, the output module can output an alarm signal to warn the user of the computer network that a possible attack is imminent or has already taken place.

It is thus possible to output an alarm signal in a flexible, rapid and precise manner in the event of a possible attack on the computer network. As a result of the modular construction of the analysis system, the individual modules can be implemented flexibly on different software or hardware components, for example on components within the computer network or on external components outside the computer network.

In an embodiment, the analysis system comprises a classification module configured to classify the plurality of warning messages by the type of anomaly indicated by a respective warning message.

The advantage of the classification module is that it can rapidly filter out the relevant warning messages which signal a critical anomaly in the computer network from the large number of incoming warning messages.

In an embodiment, the analysis system comprises an adjustment module configured to adjust the event threshold on the basis of the number of warning messages which fall below the event threshold.

This has the advantage that the adjustment module can adjust the event threshold on the basis of findings about the computer network, for example in an adaptive manner. The adjustment may for example take place as a function of the structure and the individual components of the network. The triggering of the alarm signal can thus be flexibly adjusted to varying environmental influences, for example additional software or hardware components in the computer network.

Further embodiments are described with reference to the accompanying drawings.

FIG. 1 is a schematic illustration of an embodiment of a classification 100 of warning messages into different types of anomalies. For classification, warning messages 102 carrying different types or natures of warnings are received from computers. The total volume 110 or the total fraction or the total number of warning messages contain different types of warnings which are based on different anomalies in a computer network. An anomaly in the computer network means an irregularity or peculiarity in the computer network or a pattern deviating from the norm, for example as a result of a fault. An anomaly can thus be thought of as a state of the computer differing from what is expected.

FIG. 1 shows the classification of the warning messages into a first type 111 of anomaly, a second type 112 of anomaly, a third type 113 of anomaly and a fourth type 114 of anomaly. However, any other number of types may occur. In FIG. 1, warning messages of the first type 111 of anomaly occur most frequently, then warning messages of the second type 112 of anomaly, then warning messages of the third type 113 of anomaly, and warning messages of the fourth type 114 of anomaly occur the most rarely.

From the number of warning messages of the respective type, it can be decided whether the computer system is in a critical state, in other words whether an attack on the computer system is imminent or has already taken place. If the number of warning messages of a type of anomaly, in this case the fourth type 114, based on a particular time period, falls below a particular threshold, also known as an event threshold, there is a critical state and an alarm signal 108 is triggered.

The methods and analysis systems described in the following may be based on a classification as described in FIG. 1.

Figure 2:
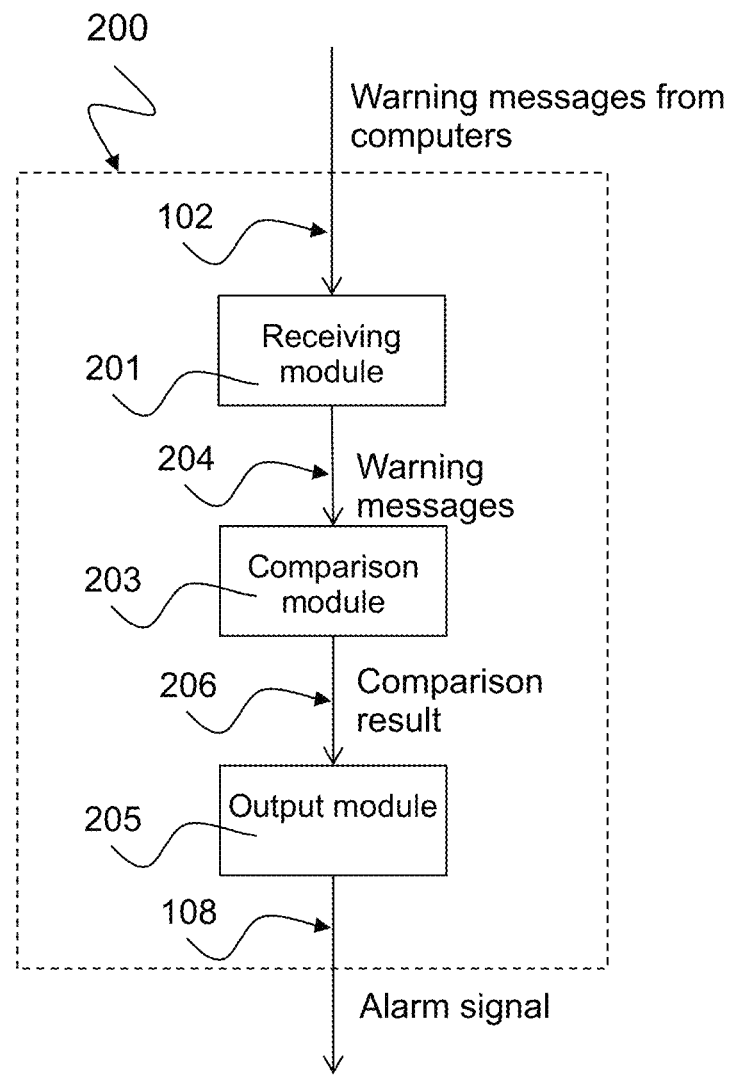
FIG. 2 is a schematic illustration of an embodiment of an analysis system 200 for detecting an attack on a computer network.

FIG. 2 is a schematic illustration of an embodiment of an analysis system 200 for detecting an attack in a computer network comprising a plurality of computers. The analysis system 100 comprises a receiving module 201, a comparison module 203 and an output module 205.

Using the receiving module 201, a plurality of warning messages 102 are received from the computers, the warning messages being based on different types of anomalies in the computer network in the illustration of FIG. 1.

Using the comparison module 203, a number or fraction of the warning messages 204 from the plurality of received warning messages is compared with a predetermined event threshold, the number or fraction of the warning messages 204 being based on a single type of anomaly in the computer network, for example the fourth type 114, as shown in FIG. 1.

Using the output module 205, an alarm signal 108 is outputted if the number of warning messages based on the same type of anomaly in the computer network, in other words a result 206 of the comparison module 203, falls below the event threshold.

In the following, the modularly constructed analysis system 200 is described in greater detail. The analysis system 200 may automatically correlate a large number of received warning messages and analyse them for the presence of an anomaly and thus of a possible indicator of an attack. As a data source, for example purposefully selected log data or alternatively a previously installed SIEM system may be used. The purpose of the analysis is to reduce the volume of available data by particular analysis methods and prepare it in the form of events in such a way that a specialist is able to detect potential attacks on the basis of the analysed log data. The underlying automated analysis method is based on searching for unfamiliar and rarely occurring events. The frequency of occurrence of a particular (or comparable) event in a particular time period is directly correlated with its "familiarity". Frequently occurring events thus tend to be classified as familiar and are therefore irrelevant. By contrast, rarely occurring events tend to be unfamiliar and thus potentially more relevant.

On this basis, together with parameters to be set individually, such as blacklists, whitelists, thresholds, event correlations and the definition of threat potentials of individual groups of people, a probability value for the presence of an attack is calculated and, in the event of exceeding a particular threshold, correlated with an event and prepared for analysis. In essence, this is thus a frequency analysis of events based on a particular time period. The parameter adjustments, which are ultimately also decisive for positive anomaly detection, can be carried out semi-automatically by the analysis system 200. Methods from the field of artificial intelligence may be used for this purpose, the analysis system 200 being able to make specific suggestions to the user/analyst, for example for adjusting a particular threshold. The suggestions may be made, among other things, on the basis of user feedback and varying constraints, such as established changes in the network architecture or predictable changes in the number of active network subscribers, for example during holiday time. A decision made by the user or analyst on a provided suggestion may in turn influence future suggestions.

Figure 3:
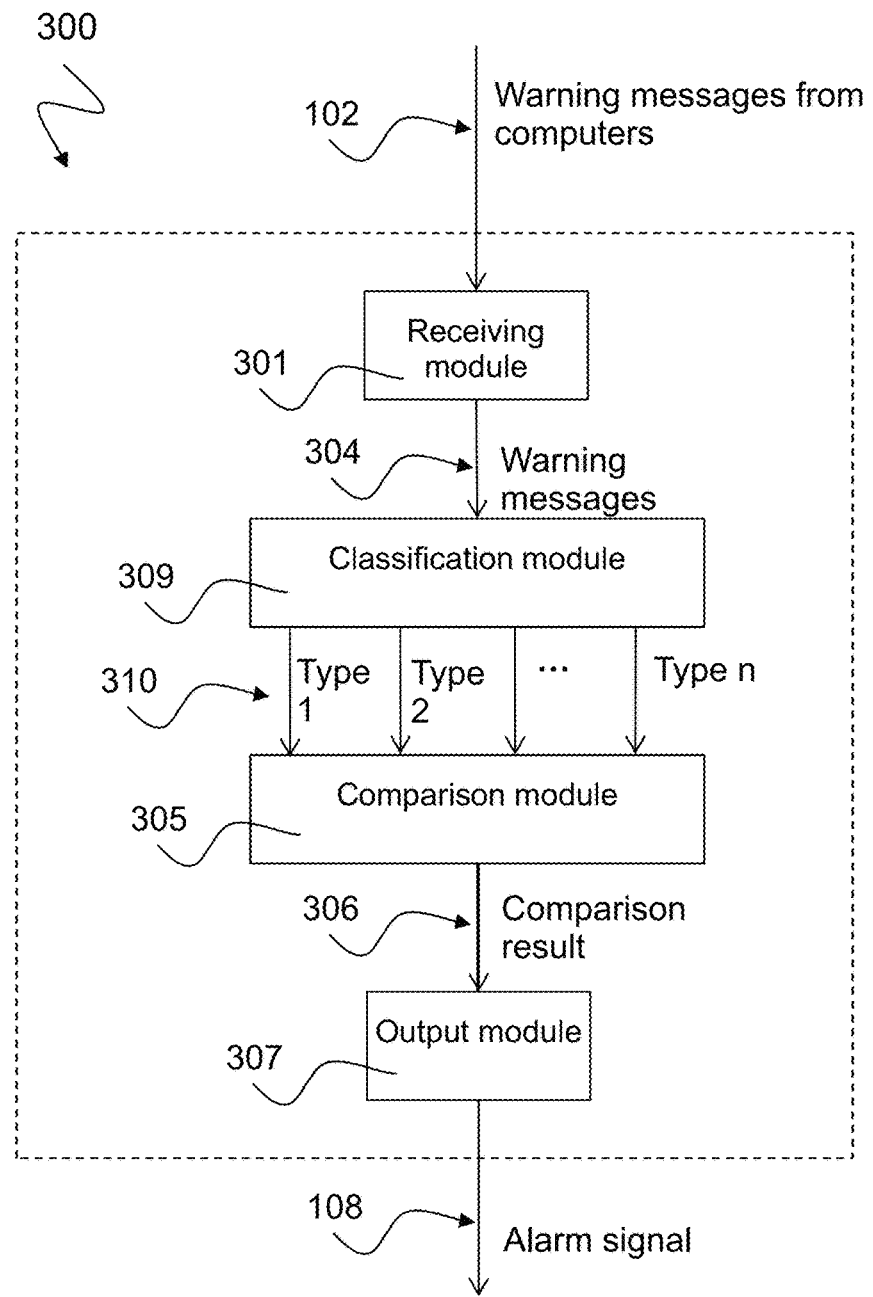
FIG. 3 is a schematic illustration of a further embodiment of an analysis system 300 for detecting an attack on a computer network.

FIG. 3 is a schematic illustration of a further embodiment of an analysis system 300 for detecting an attack in a computer network comprising a plurality of computers. The analysis system 300 comprises a receiving module 301, a classification module 309, a comparison module 305 and an output module 307.

Using the receiving module 301, a plurality of warning messages 102 are received from the computers, the warning messages being based on different types of anomalies in the computer network in accordance with the illustration in FIG. 1.

The plurality of warning messages may be received in a predetermined time interval, for example 1 second, 1 minute, 5 minutes, 30 minutes or 1 hour.

To generate the warning messages, for example one or more of the following systems may be used, which may for example be installed on one or more of the computers of the computer network: a virus scanner, a proxy server, an IDS (intrusion detection system), a firewall, an operating system, a log management system, an SIEM system (security information and event management system).

Using the classification module 309, the plurality of warning messages are classified by the type 310 of anomaly indicated by a respective warning message. The warning messages 304 are divided into different classes, which are associated with a type 310 of anomaly in the computer network, and passed on to the comparison module 305.

The plurality of warning messages can thus be classified by the type of anomaly indicated by a respective warning message. The type of anomaly indicated by a warning message may for example be determined on the basis of the content of the warning message, for example by evaluating a data field such as a header or a payload in the warning message.

Using the comparison module 305, a number or fraction of the warning messages from the plurality of received warning messages is compared with a predetermined event threshold, the number or fraction of the warning messages being based on a single type of anomaly in the computer network, for example the fourth type 114, as shown in FIG. 1. In FIG. 3, the respective numbers or fractions of the warning messages correspond to the classes into which the warning messages were classified by the classification module 309. The comparison module may for example carry out the comparison in a predetermined time interval so as to have a reference.

The comparison may for example be carried out by counting the received warning messages which are classified as the same type, for example by counting within a predetermined time interval. If the warning messages thus counted within the predetermined time interval fall below the event threshold, the output module 307 can be instructed to output the alarm signal 108, for example by way of the result 306 of the comparison.

Using the output module 307, the alarm signal 108 is outputted if the number of warning messages based on the same type 310 of anomaly in the computer network, in other words the number of warning messages assigned to a particular class, falls below the event threshold.

In addition to outputting the alarm signal, the output module 307 may determine a probability value for the presence of an attack on the computer network, for example on the basis of an analysis of the number or fraction of the warning messages which fall below the event threshold. The probability value may further be determined on the basis of one or more of the following predetermined parameters: blacklists, whitelists, thresholds, event correlations, and definition of threat potentials of individual user groups of the computer network. The probability value for the presence of an attack on the computer network may further be determined on the basis of a number of visitors to the computer network, in particular of a number of visitors to a Web page of the computer network, as is described in greater detail below in relation to FIG. 4. The probability value for the presence of an attack on the computer network may further be determined on the basis of a frequency of rarely executed processes in the computer network, as is described in greater detail below in relation to FIG. 5. The probability value for the presence of an attack on the computer network may further be determined on the basis of a frequency of programs which are carried out on a predetermined group of the plurality of computers in the computer network, in particular on the basis of a frequency of programs which have only been executed on the predetermined group of computers since a predetermined time, as is described in greater detail below in relation to FIG. 5.

The analysis system 300 may further comprise an adjustment module (not shown in FIG. 3), by means of which the event threshold can be adjusted on the basis of the fraction of warning messages of which the number falls below the event threshold. For this purpose, for example a suggestion to adjust the event threshold may be made which may be based on the number of warning messages which fall below the event threshold. The suggestion may further be based on user feedback and/or changes in the network architecture of the computer network, in particular changes in the number of computers in the computer network. The event threshold may be adjusted adaptively, for example as a function of at least one of the following events: user feedback, changes in the network architecture of the computer network, changes in the number of computers in the computer network.

Figure 4:
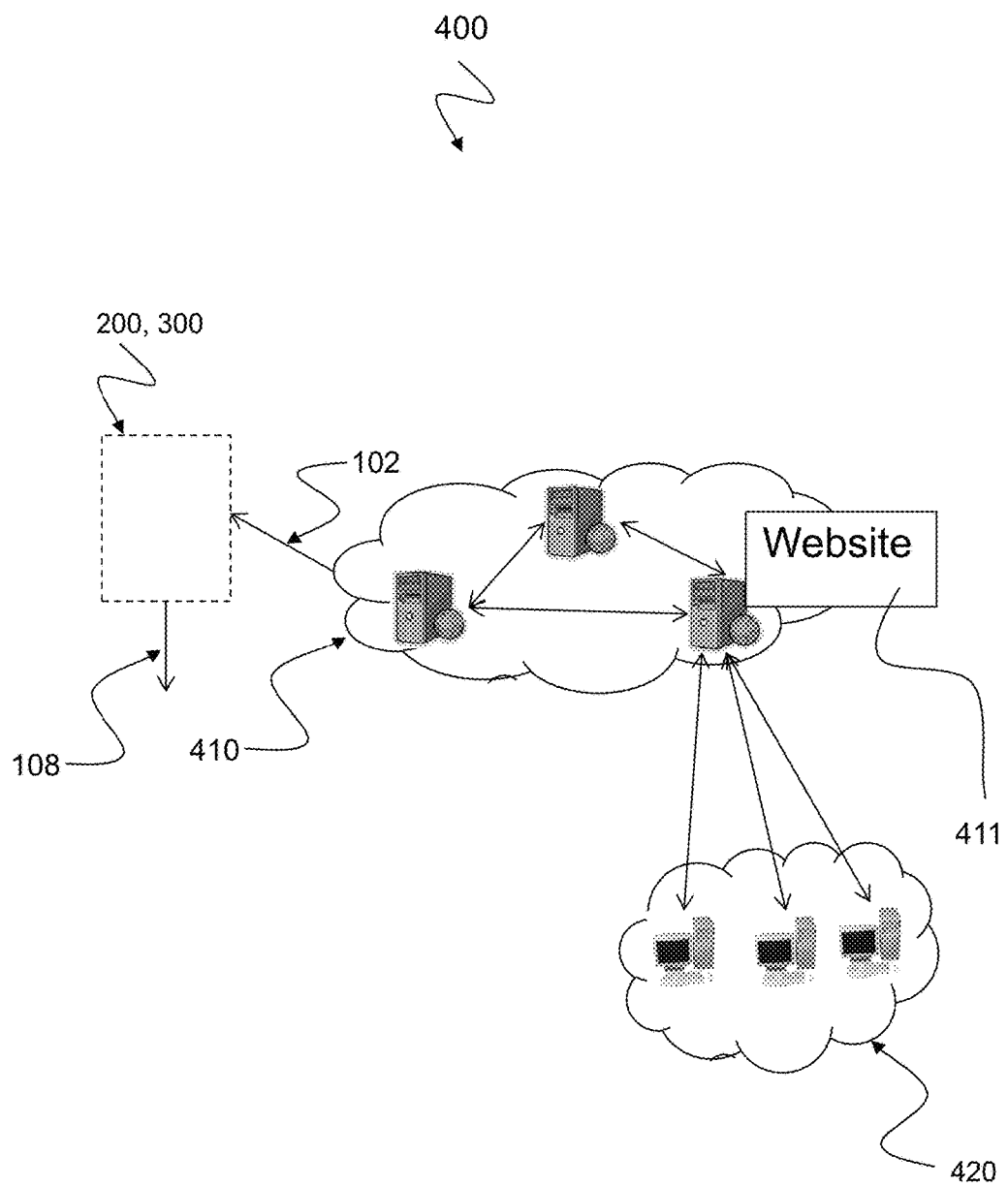
FIG. 4 is a schematic illustration of a scenario 400 of an attack on an Internet Web page 411 of a computer network 410, an analysis system 200, 300 in accordance with an embodiment detecting the attack.

FIG. 4 is a schematic illustration of a scenario 400 of an attack on an Internet Web page 411 of a computer network 410, an analysis system 200, 300 detecting the attack. The attack originates from a small group of visitors 420 to the Internet Web page 411. The analysis system 200, 300 may correspond to the systems described in FIG. 2 or FIG. 3.

The analysis system 200 may comprise a receiving module 201, a comparison module 203 and an output module 205. Using the receiving module 201, a plurality of warning messages 102 are received by the computers, the warning messages being based on different types of anomalies in the computer network in accordance with the illustration in FIG. 1. Using the comparison module 203, a number or fraction of the warning messages from the plurality of received warning messages is compared with a predetermined event threshold, the number or fraction of the warning messages being based on a single type of anomaly in the computer network. Using the output module 205, an alarm signal 108 is outputted if the number of warning messages based on the same type of anomaly in the computer network falls below the event threshold.

In the following, a mode of operation of the analysis system 200, 300 is described. If many different visitors visit a particular system on the Internet, for example a Web page 411, this process is presumed to be non-critical. However, if the system is merely addressed by a small user group 420, a C2 server could potentially be involved. If in addition the relevant users are a particular group of people having an increased threat potential, the analysis system 200, 300 generates an event or an alarm signal 108 which can subsequently be analysed by a specialist.

Figure 5:
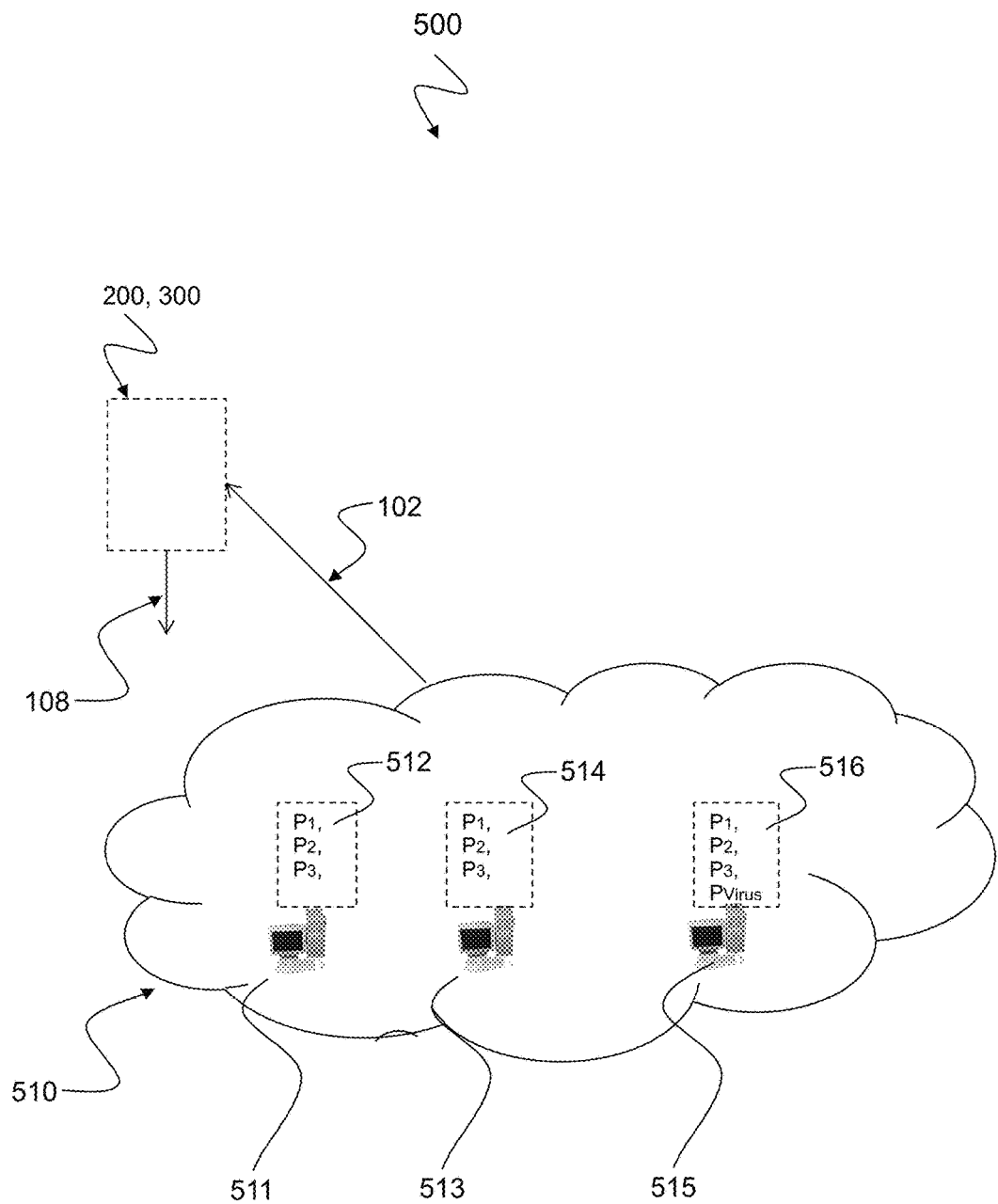
FIG. 5 is a schematic illustration of a scenario 500 of a virus attack on a group of networked computers of a company's internal computer network 510, an analysis system 200, 300 in accordance with an embodiment detecting the attack.

FIG. 5 is a schematic illustration of a scenario 500 of a virus attack on a group of networked computers of a company's internal computer network 510, an analysis system 200, 300 detecting the attack. The analysis system 200, 300 may correspond to the systems described in FIG. 2 or FIG. 3.

The analysis system 200 may comprise a receiving module 201, a comparison module 203 and an output module 205. Using the receiving module 201, a plurality of warning messages 102 are received from the computers, the warning messages being based on different types of anomalies in the computer network in accordance with the illustration in FIG. 1. Using the comparison module 203, a number or fraction of the warning messages from the plurality of received warning messages is compared with a predetermined event threshold, the number or fraction of the warning messages being based on a single type of anomaly in the computer network. Using the output module 205, an alarm signal 108 is outputted if the number of warning messages based on the same type of anomaly in the computer network falls below the event threshold.

In the following, a mode of operation of the analysis system 200, 300 is described. Assuming that most office PCs 511, 513, 515 in a relatively large company are comparably configured and for the most part identical software applications $P_1$, $P_2$, $P_3$ are used, the comparison of a large number of process lists 512, 514, 516 can identify rarely executed programs $P_{Virus}$. A program $P_{Virus}$ which for example is only being executed on a small group of computers 515 and has only been executed for a short time may be an indication of a recently installed malware $P_{Virus}$. The analysis system 200, 300 therefore does not have to search for particular processes, but can identify unfamiliar processes $P_{Virus}$ by eliminating the familiar or frequently occurring processes $P_1$, $P_2$, $P_3$. After evaluation of the further parameters, this event can be summarised as a correlated event or an alarm signal 108 and presented to a user or analyst for further examination.

Figure 6:
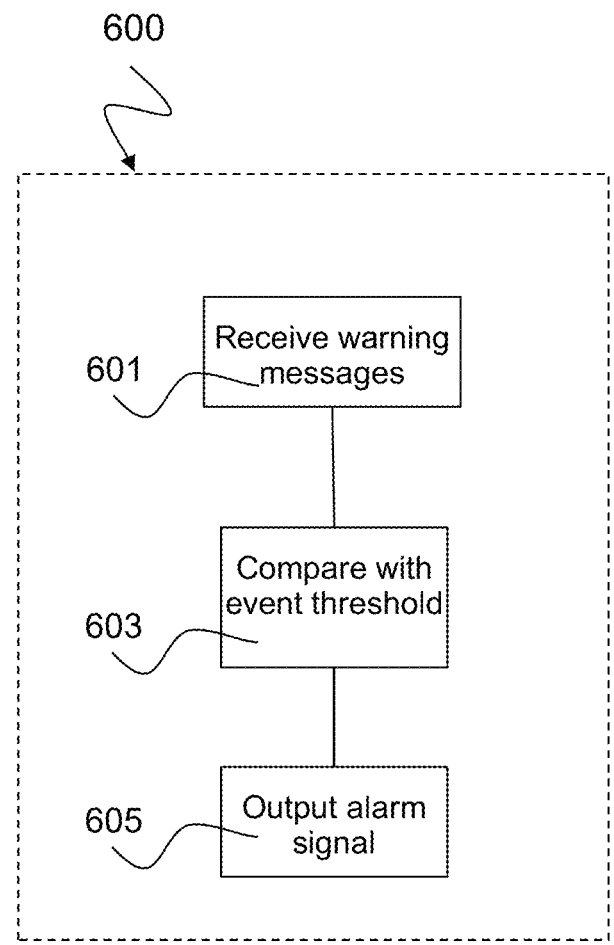
FIG. 6 is a schematic illustration of a method 600 for detecting an attack on a computer network in accordance with an embodiment.

FIG. 6 is a schematic illustration of a method 600 for detecting an attack on a computer network in accordance with an embodiment. The method 600 comprises receiving 601 a plurality of warning messages from the computers, the warning messages being based on various types of anomalies in the computer network. The method 600 comprises comparing 603 a number or fraction of the warning messages from the plurality of received warning messages with a predetermined event threshold, the number or fraction of the warning messages being based on a single type of anomaly in the computer network. The method 600 comprises outputting 605 an alarm signal if the number of warning messages based on the same type of anomaly in the computer network falls below the event threshold.

In an embodiment, the method 600 may comprise receiving the plurality of warning messages in a predetermined time interval. In an embodiment, the method 600 may comprise classifying the plurality of warning messages by the type of anomaly indicated by a respective warning message. In an embodiment, the method 600 may comprise determining the type of anomaly indicated by a warning message on the basis of the content of the warning message. In an embodiment, the method 600 may comprise counting the received warning messages which are classified as the same type in the predetermined time interval; and outputting the alarm signal if the number of warning messages counted in the predetermined time interval falls below the event threshold. In an embodiment, the method 600 may comprise determining a probability value for the presence of an attack on the computer network on the basis of the number of warning messages which fall below the event threshold.

In an embodiment, the method 600 may comprise determining the probability value for the presence of an attack on the computer network, further on the basis of at least one of the following predetermined parameters: blacklists, whitelists, thresholds, event correlations, and definition of threat potentials of individual user groups of the computer network. In an embodiment, the method 600 may comprise determining the probability value for the presence of an attack on the computer network, further on the basis of a number of visitors to the computer network, in particular of a number of visitors to a Web page of the computer network. In an embodiment, the method 600 may comprise determining the probability value for the presence of an attack on the computer network, further on the basis of a frequency of rarely executed processes in the computer network.

In an embodiment, the method 600 may comprise determining the probability value for the presence of an attack on the computer network, further on the basis of a frequency of programs which are being executed on a predetermined group of the plurality of computers in the computer network, in particular on the basis of a frequency of programs which have only been executed on the predetermined group of computers since a predetermined time.

In an embodiment, the method 600 may comprise using one or more of the following systems on at least one of the plurality of computers to generate the warning messages: virus scanner, proxy server, IDS (intrusion detection system), firewall, operating system, log management system, SIEM system (security information and event management system). In an embodiment, the method 600 may comprise adjusting the event threshold on the basis of the number of warning messages which fall below the event threshold. In an embodiment, the method 600 may comprise making a suggestion to adjust the event threshold on the basis of the number of warning messages which fall below the event threshold and further on the basis of user feedback and/or changes in the network architecture of the computer network, in particular changes in the number of computers in the computer network. In an embodiment, the method 600 may comprise adaptively adjusting the event threshold, for example as a function of at least one of the following events: user feedback, changes in the network architecture of the computer network, changes in the number of computers in the computer network.

An aspect of the invention also comprises a computer program product which can be loaded directly onto the internal memory of a digital computer and which comprises software code portions by means of which the method 600 described in relation to FIG. 6 can be executed when the product runs on a computer. The computer program product may be stored on a computer-compatible medium and comprise the follow: computer-readable program media which cause a computer to receive 601 a plurality of warning messages from the computers, the warning messages being based on different types of anomalies in the computer network; to compare 603 a number of warning messages from the plurality of received warning messages with a predetermined event threshold, the number of warning messages being based on a single type of anomaly in the computer network; and to output 605 an alarm signal if the number of warning messages based on the same type of anomaly in the computer network falls below the event threshold. The computer may be a PC, for example a PC of a computer network. The computer may be implemented as a chip, an ASIC, a microprocessor or a signal processor and be arranged in a computer network, for example a computer network as described in FIG. 4 or FIG. 5.

It goes without saying that the features of the various embodiments described herein by way of example can be combined with one another unless specifically stated otherwise. As portrayed in the description and drawings, individual elements which are portrayed as being connected need not be directly interconnected; intermediate elements may be provided between the connected elements. Further, it goes without saying that embodiments of the invention may be implemented in individual circuits, partially integrated circuits or fully integrated circuits or programming media. The term "for example" merely denotes an example, and not the best or optimum example. Particular embodiments have been illustrated and described herein, but it is obvious to the person skilled in the art that numerous alternative and/or equivalent implementations can be realised instead of the shown and described embodiments without departing from the idea of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

LIST OF REFERENCE NUMERALS

100: classifying warning messages
102: warning messages
110: total volume of warning messages
111: anomaly of a first type
112: anomaly of a second type
113: anomaly of a third type
114: anomaly of a fourth type
108: alarm signal
200: analysis system
201: receiving module
203: comparison module
205: output module
204: warning messages
206: comparison result
300: analysis system
301: receiving module
307: classification module
303: comparison module
305: output module
304: warning messages
310: types of anomalies
306: comparison result
108: alarm signal or indicator of attack on the computer network
400: scenario of an attack on an Internet Web page of a computer network
410: computer network
411: Internet Web page
420: small group of users
500: scenario of a virus attack on a group of networked computers of a company's internal computer network
510: company's internal computer network
511, 513, 515: computers in computer network
512, 514, 516: process lists on the computers
$P_1$, $P_2$, $P_3$: processes running on the computers
$P_{Virus}$: malware on computer
600: method for determining an indicator of an attack on a computer network
601: $1^{st}$ method step: receiving
603: $2^{nd}$ method step: comparing
605: $3^{rd}$ method step: outputting

The invention claimed is:

1. A method for analyzing warning messages in a computer network comprising a plurality of computers, the method comprising:
receiving, by an analysis system, a plurality of warning messages from the computers, wherein the received warning messages include warning messages corresponding to different types of anomalies in the computer network;
determining, by the analysis system, that a first type of anomaly in the computer network is unfamiliar by determining a number of received warning messages corresponding to the first type of anomaly in the computer network is below a predetermined event threshold;
in response to determining that the first type of anomaly is unfamiliar:
outputting, by the analysis system, an alarm signal; and
determining, by the analysis system, a probability that the first type of anomaly corresponds to an attack on the computer network based on: the difference between the number of received warning messages corresponding to the first type of anomaly in the computer network and the predetermined event threshold, a frequency of rarely executed processes in the computer network, or a frequency of programs which have only been executed on a predetermined group of computers of the plurality of computers in the computer network since a predetermined time; and
in response to the determined probability exceeding a particular threshold:
correlating, by the analysis system, the determined probability with an event;
outputting, by the analysis system, the event to a specialist for analysis; and
adjusting, by the analysis system, the predetermined event threshold based on the degree to which the number of received warning messages corresponding to the first type of anomaly in the computer network is below the predetermined event threshold.

2. The method according to claim 1, wherein the plurality of warning messages are received in a predetermined time interval.

3. The method according to claim 2, further comprising: classifying the plurality of warning messages by the type of anomaly indicated by respective warning messages of the plurality of warning messages.

4. The method according to claim 2, further comprising: determining the type of anomaly indicated by a warning message of the plurality of warning messages based on a content of the warning message.

5. The method according to claim 3, further comprising: determining the number of received warning messages corresponding to a first type of anomaly in the computer network by counting warning messages classified as corresponding to the first type of anomaly received in the predetermined time interval.

6. The method according to claim 1, wherein determining the probability is further based on at least one of the following predetermined parameters: blacklists, whitelists, thresholds, event correlations and definition of threat potentials of individual user groups of the computer network.

7. The method according to claim 1, wherein determining the probability is further based on a number of visitors to a Web page of the computer network.

8. The method according to claim 1, wherein warning messages of the plurality of warning messages are generated using one or more of the following systems on at least one of the plurality of computers: a virus scanner, a proxy server, an intrusion detection system (IDS), a firewall, an operating system, a log management system, and a security information and event management (SIEM) system.

9. The method according to claim 1, further comprising: adaptively adjusting the predetermined event threshold as a function of at least one of the following: user feedback, changes in the network architecture of the computer network, changes in the number of computers in the computer network.

10. An analysis system for analyzing warning messages in a computer network comprising a plurality of computers, the analysis system comprising a processor and a non-transitory computer-readable medium having processor-executable instructions stored thereon, the processor-executable instructions, when executed by the processor, facilitating performance of the following:

receiving a plurality of warning messages from the computers, wherein the received warning messages include warning messages corresponding to different types of anomalies in the computer network;

determining that a first type of anomaly in the computer network is unfamiliar by determining a number of received warning messages corresponding to the first type of anomaly in the computer network is below a predetermined event threshold;

in response to determining that the first type of anomaly is unfamiliar:

outputting an alarm signal; and determining a probability that the first type of anomaly corresponds to an attack on the computer network based on: the difference between the number of received warning messages corresponding to the first type of anomaly in the computer network and the predetermined event threshold, a frequency of rarely executed processes in the computer network, or a frequency of programs which have only been executed on a predetermined group of computers of the plurality of computers in the computer network since a predetermined time; and in response to the determined probability exceeding a predetermined threshold, correlating the determined probability with an event, outputting the event to a specialist for analysis, and adjusting the predetermined event threshold based on the degree to which the number of received warning messages corresponding to the first type of anomaly in the computer network is below the predetermined event threshold.

11. The analysis system according to claim 10, wherein the processor-executable instructions, when executed, further facilitate:

classifying the plurality of warning messages by the type of anomaly indicated by a respective warning message.

12. A method for detecting an attack in a computer network comprising a plurality of computers, the method comprising:

receiving, by an analysis system, a plurality of warning messages from the computers, wherein the received warning messages include warning messages corresponding to different types of anomalies in the computer network;

determining, by the analysis system, that a first type of anomaly in the computer network is unfamiliar by determining a number of received warning messages corresponding to a first type of anomaly in the computer network is below a predetermined event threshold;

in response to determining that the first type of anomaly is unfamiliar:

outputting, by the analysis system, an alarm signal; and determining, by the analysis system, a probability that the first type of anomaly corresponds to an attack on the computer network based on: the difference between the number of received warning messages corresponding to the first type of anomaly in the computer network and the event threshold, or at least one of the following predetermined parameters: blacklists, whitelists and definition of threat potentials of individual user groups of the computer network; and in response to the determined probability exceeding a particular threshold:

correlating, by the analysis system, the determined probability with an event;

outputting, by the analysis system, the event to a specialist for analysis; and adjusting, by the analysis system, the predetermined event threshold based on the degree to which the number of received warning messages corresponding to the first type of anomaly in the computer network is below the predetermined event threshold.

13. The method according to claim 12, wherein determining the probability is further based on a number of visitors to a Web page of the computer network.

14. The method according to claim 12, wherein determining the probability is further based on an identification of one or more rarely executed processes in the computer network.

15. The method according to claim 12, wherein determining the probability is further based on an identification of one or more programs which have only been executed on a predetermined group of computers of the plurality of computers in the computer network since a predetermined time.

\* \* \* \* \*